(12) United States Patent
Gaully et al.

(10) Patent No.: US 9,194,755 B2
(45) Date of Patent: Nov. 24, 2015

(54) DEVICE FOR MEASURING TEMPERATURE IN A PRIMARY STREAM FLOW PASSAGE OF A BYPASS TURBOJET

(75) Inventors: Bruno Robert Gaully, Marolles en Hurepoix (FR); Thierry Poix, Dammarie les Lys (FR); Maurice Georges Vernochet, La Rochette (FR)

(73) Assignee: SNECMA, Paris (FR)

( * ) Notice: Subject to any disclaimer, the term of this patent is extended or adjusted under 35 U.S.C. 154(b) by 568 days.

(21) Appl. No.: 13/640,648

(22) PCT Filed: Apr. 5, 2011

(86) PCT No.: PCT/FR2011/050758
§ 371 (c)(1),
(2), (4) Date: Nov. 14, 2012

(87) PCT Pub. No.: WO2011/128555
PCT Pub. Date: Oct. 20, 2011

(65) Prior Publication Data
US 2013/0051426 A1  Feb. 28, 2013

(30) Foreign Application Priority Data

Apr. 12, 2010  (FR) .................................. 10 52760

(51) Int. Cl.
*G01K 1/14* (2006.01)
*G01K 13/02* (2006.01)
*F01D 17/08* (2006.01)
*F01D 17/10* (2006.01)
*F02C 9/18* (2006.01)
*F02C 9/52* (2006.01)

(52) U.S. Cl.
CPC .............. *G01K 13/02* (2013.01); *F01D 17/085* (2013.01); *F01D 17/105* (2013.01); *F02C 9/18* (2013.01); *F02C 9/52* (2013.01); *G01K 1/14* (2013.01)

(58) Field of Classification Search
CPC ......... G01K 1/14; G01K 7/42; G01K 13/002; G01K 13/02; B64D 27/20; B64D 27/18; B64D 27/16
USPC ................. 374/138, 148, 144, 141, 163, 208; 415/17, 20, 44, 145, 157, 48, 118; 416/37, 39; 60/39.53, 39.3
See application file for complete search history.

(56) References Cited

U.S. PATENT DOCUMENTS

| 2,477,798 | A | * | 8/1949 | Arnold ............................ 60/262 |
| 4,710,095 | A | | 12/1987 | Freberg et al. |
| 5,397,181 | A | * | 3/1995 | McNulty ....................... 374/144 |
| 2008/0063515 | A1 | | 3/2008 | Bil et al. |

FOREIGN PATENT DOCUMENTS

EP  1 865 184  12/2007

OTHER PUBLICATIONS

International Search Report Issued Sep. 6, 2011 in PCT/FR11/050758 Filed Apr. 5, 2011.

* cited by examiner

*Primary Examiner* — Lisa Caputo
*Assistant Examiner* — Nathaniel T Woodward
(74) *Attorney, Agent, or Firm* — Oblon, McClelland, Maier & Neustadt, L.L.P.

(57) ABSTRACT

A device for measuring a compressor inlet temperature in a primary stream flow passage of a bypass turbojet. The device includes an airtight hollow structure forming a connection arm of an intermediate casing of the turbojet and configured to pass radially through a flow passage for the primary stream and a flow passage for a secondary stream of the turbojet, the connection arm including at least one inlet air orifice opening out into the primary stream flow passage at an inlet of a compressor and at least one air outlet orifice leading to a zone of the turbojet in which surrounding pressure is less than pressure in the primary stream flow passage at the inlet of the compressor; and a temperature probe having its sensitive element arranged inside the connection arm.

10 Claims, 3 Drawing Sheets

DEVICE FOR MEASURING TEMPERATURE IN A PRIMARY STREAM FLOW PASSAGE OF A BYPASS TURBOJET

BACKGROUND OF THE INVENTION

The present invention relates to the general field of measuring temperature in the primary stream of a two-spool bypass turbojet, this measurement being performed at the inlet to the high-pressure compressor.

In a two-spool bypass turbojet, the measurement of the temperature of the gas stream flowing in the primary flow passage at the inlet of its high-pressure compressor (this temperature is also referred to as the "temperature $T_{25}$") is used in numerous relationships for regulating the turbojet. The measurement of the temperature $T_{25}$ appears in particular in the relationship for determining the positions of the various variable-geometry parts of the turbojet.

It is known to measure the temperature $T_{25}$ by means of a temperature probe that is placed directly in the primary stream flow passage at the inlet to the high-pressure compressor. Usually, such probes comprise a casting fitted with an inertial separator for protecting the sensitive element of the probe against moisture, water, ice, sand, and other foreign bodies. The casting may also include a heater resistance that is activated to prevent the formation of ice that might otherwise obstruct the inlet of the probe and that could present a mass that might damage the blades downstream.

That type of probe with an inertial separator presents numerous drawbacks. In particular the casting is complex to fabricate, thereby making the cost of the probe high. Furthermore, the presence of the probe in the primary stream flow passage creates a wake that disturbs said flow as it penetrates into the high-pressure compressor. Furthermore, the de-icing function of the probe requires an external electrical power supply and a switch relay in the electronic computer of the turbojet, and also requires software to correct the measurement error that results from the heating of the casting. Finally, the probe must withstand aerodynamic stresses at high frequencies.

OBJECT AND SUMMARY OF THE INVENTION

A main object of the present invention is thus to propose a device for measuring the temperature $T_{25}$ that does not present the above-mentioned drawbacks.

This object is achieved by a device for measuring the compressor inlet temperature in a primary stream flow passage of a bypass turbojet, the device comprising an airtight hollow structure forming a connection arm of an intermediate casing of the turbojet and designed to pass radially through a flow passage for the primary stream and a flow passage for the secondary stream of the turbojet, the connection arm having at least one inlet air orifice for opening out into the primary stream flow passage at the inlet of a compressor and at least one air outlet orifice for leading to a zone of the turbojet in which the surrounding pressure is less than the pressure in the primary stream flow passage at the inlet of the compressor, the device further including a temperature probe having its sensitive element arranged inside the connection arm.

With the device of the invention, the inside of the connection arm in which the sensitive element of the temperature probe is mounted passes a gas stream that is taken from the primary stream flow passage and then exhausted into the secondary stream flow passage. The device of the invention thus enables the temperature $T_{25}$ to be measured.

The invention provides for incorporating the temperature probe in a connection arm of the intermediate casing of the turbojet. The sensitive element of the temperature probe that is housed inside the connection arm is thus protected from being splashed by water and from being struck by impacts against foreign bodies (ice, sand, etc.). As a result, the temperature probe of the device of the invention may be of simple design and thus of low cost (in particular because it does not have a casting). Furthermore, there is no need to have recourse to a de-icing function for the probe, thereby eliminating the drawbacks associated with such a function (external electrical power supply, switch relay in the electronic computer of the turbojet, and software for correcting the measurement error). In addition, compared with existing devices, the device of the invention does not give rise to any additional wake in the flow of the primary stream. Finally, the temperature probe of the device of the invention is not subjected to aerodynamic stresses at high frequencies.

The connection arm may comprise two side walls connected together in airtight manner, firstly by walls forming a leading edge and a trailing edge, and secondly by transverse walls.

Under such circumstances, and preferably, the air inlet orifice of the connection arm is formed in a side wall and the air outlet orifice is formed in the wall forming the trailing edge. The presence of the air inlet orifice in a side wall of the connection arm makes it possible to minimize any risk of the air inlet being obstructed by the formation of ice (ice generally forms along the leading edge of the connection arm). The air outlet orifice situated in the trailing edge presents the advantage of directing the outgoing stream in the flow direction of the secondary stream.

The temperature probe is advantageously mounted in leaktight manner against the wall of the connection arm that forms the trailing edge. The temperature probe may be of the pencil type.

Furthermore, a partition may extend radially from one of the transverse walls in order to improve the flow of air around the temperature probe by confining it in a restricted space.

The air outlet orifice of the connection arm may be designed to lead into the secondary stream flow passage of the turbojet.

The invention also provides an intermediate casing for a bypass turbojet, the casing comprising a hub, an outer annular shroud arranged around the hub, concentrically thereabout, and a device as defined above, the connection arm of said device connecting the hub radially to the outer shroud.

Preferably, the sensitive element of the temperature probe of the device is arranged inside the connection arm in such a manner as to extend in a direction that is substantially parallel to the axis of revolution of the hub and of the shroud. As a result, the sensitive element of the probe is placed transversely relative to the longitudinal flow of the gas stream sample.

The invention also provides a bypass turbojet including an intermediate casing as defined above.

BRIEF DESCRIPTION OF THE DRAWINGS

Other characteristics and advantages of the present invention appear from the following description given with reference to the accompanying drawings that show an embodiment having no limiting character. In the figures.

DETAILED DESCRIPTION OF AN EMBODIMENT

Figure 1:
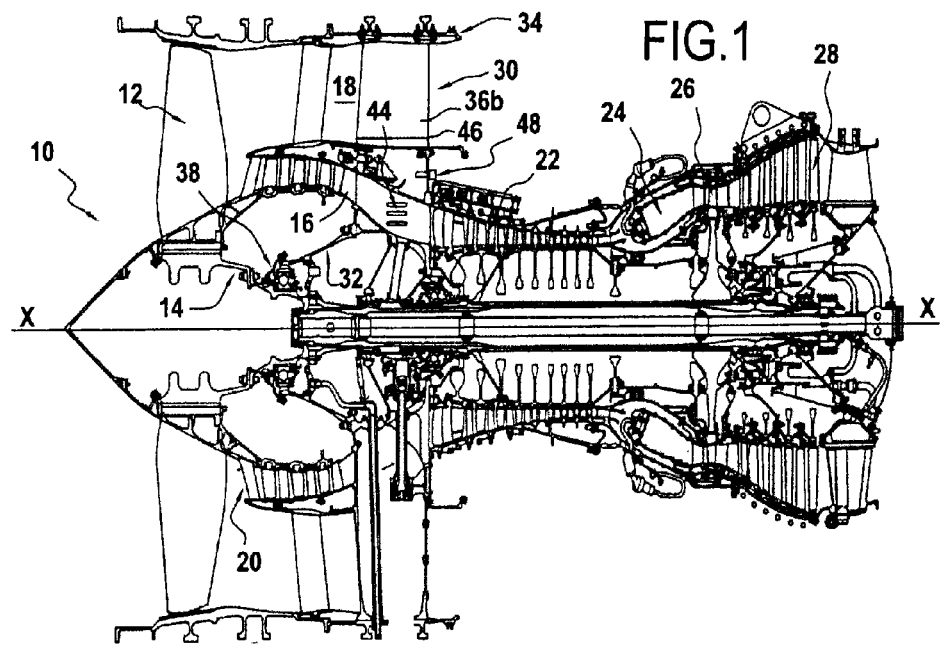
FIG. 1 is a diagrammatic longitudinal section view of a two-spool bypass turbojet showing the location of the measurement device of the invention.

FIG. 1 is a diagram of a turbojet 10 of the two-spool bypass type to which the invention applies in particular. Naturally, the invention is not limited to this particular type of turbojet and it applies to other two-spool bypass turbojet architectures.

In known manner, the turbojet of longitudinal axis X-X comprises in particular a fan 12 connected to the upstream end of a low-pressure shaft 14. The turbojet also has two coaxial passages for passing gas streams, namely a flow passage 16 for the primary stream (or hot stream) and a flow passage 18 for the secondary stream (or cold stream).

From upstream to downstream in the flow direction of the gas streams passing therethrough, the primary gas flow passage 16 comprises a low-pressure compressor 20, a high-pressure compressor 22, a combustion chamber 24, a high-pressure turbine 26, and a low-pressure turbine 28.

The turbojet also has an intermediate casing 30 having, in known manner, a structural function (since it serves to transmit forces). In particular, the means for fastening the turbojet to the structure of the airplane in the front portion are secured to the intermediate casing.

The intermediate casing 30 comprises a hub 32 centered on the longitudinal axis X-X, an outer annular shroud 34 arranged around the hub, concentrically thereabout, and a plurality of connection arms 36a to 36f radially connecting the hub to the outer shroud.

The hub 32 of the intermediate casing rotatably supports a front rolling bearing 38 mounted on the low-pressure shaft 14 at the upstream end thereof. The outer shroud 34 defines part of the outside of the secondary stream flow passage 18.

Figure 2:
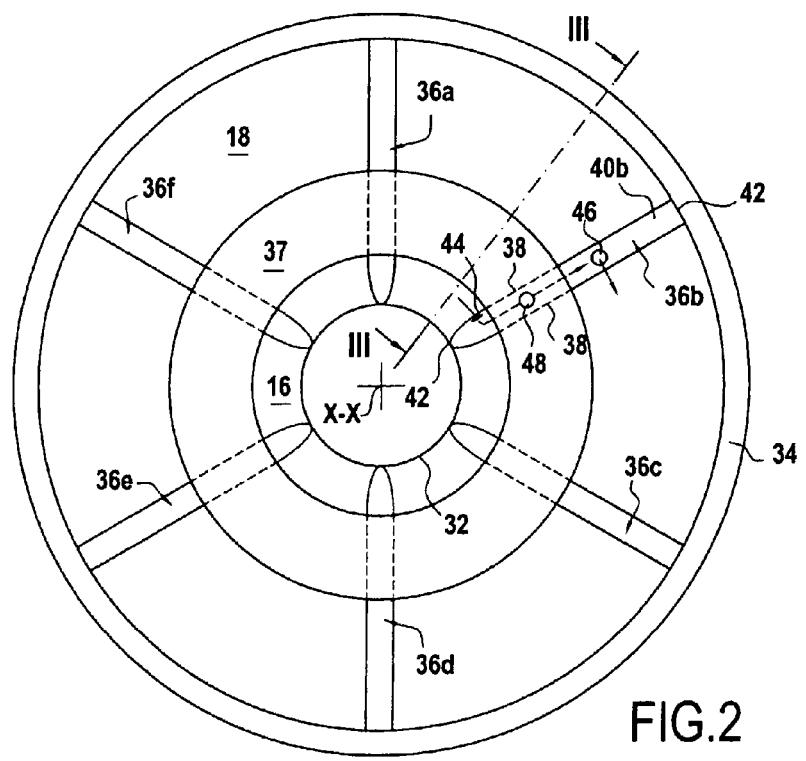
FIG. 2 is a rear view of the intermediate casing of the FIG. 1 turbojet.
Figure 3:
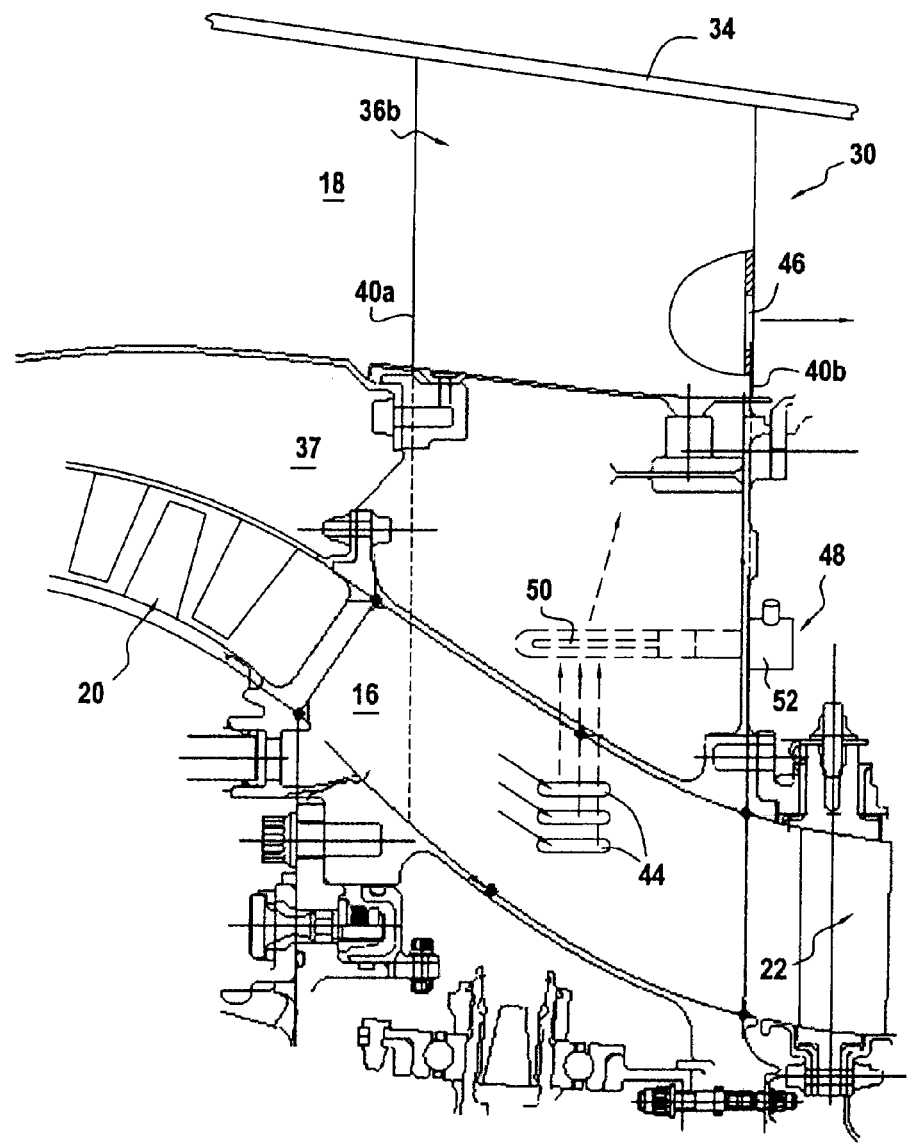
FIG. 3 is a section view on III-III of FIG. 2.

As shown in FIG. 2, the connection arms 36a to 36f (e.g. six in number) are regularly distributed around the longitudinal axis X-X of the turbojet. These connection arms extend radially from the outside towards the inside through the secondary stream flow passage 18, through a stationary annular structure 37 of the turbojet, and through the primary stream flow passage 16. Relative to the primary stream flow passage they are situated at the "swan neck", i.e. between the outlet from the low-pressure compressor 20 and the inlet to the high-pressure compressor 22 (see also FIG. 3).

Each of the connection arms 36a to 36f is in the form of a rigid structure that is hollow and within which it is possible to locate various services of the turbojet. For example, for the turbojet shown in FIGS. 1 and 2, the connection arm 36a receives oil delivery pipes and various probes for measuring the speed of the low-pressure shaft; the connection arm 36d receives oil return pipes and the radial take-off shaft for imparting rotary drive to the accessory gearbox of the engine; and the connection arm 36e receives oil drain pipes.

The invention provides a device enabling the temperature of the gas stream passing through the primary stream flow passage 16 to be measured in the swan neck. This temperature measurement (referred to as temperature $T_{25}$) is used in numerous relationships for regulating the turbojet.

According to the invention, in order to perform this measurement, provision is made to use one of the connection arms 36a to 36f of the intermediate casing 30. Since the connection arms 36b, 36c, and 36f are not used for passing services of the engine, it is preferable to select one of these connection arms (and in this example the connection arm 36b is selected).

Figure 4:
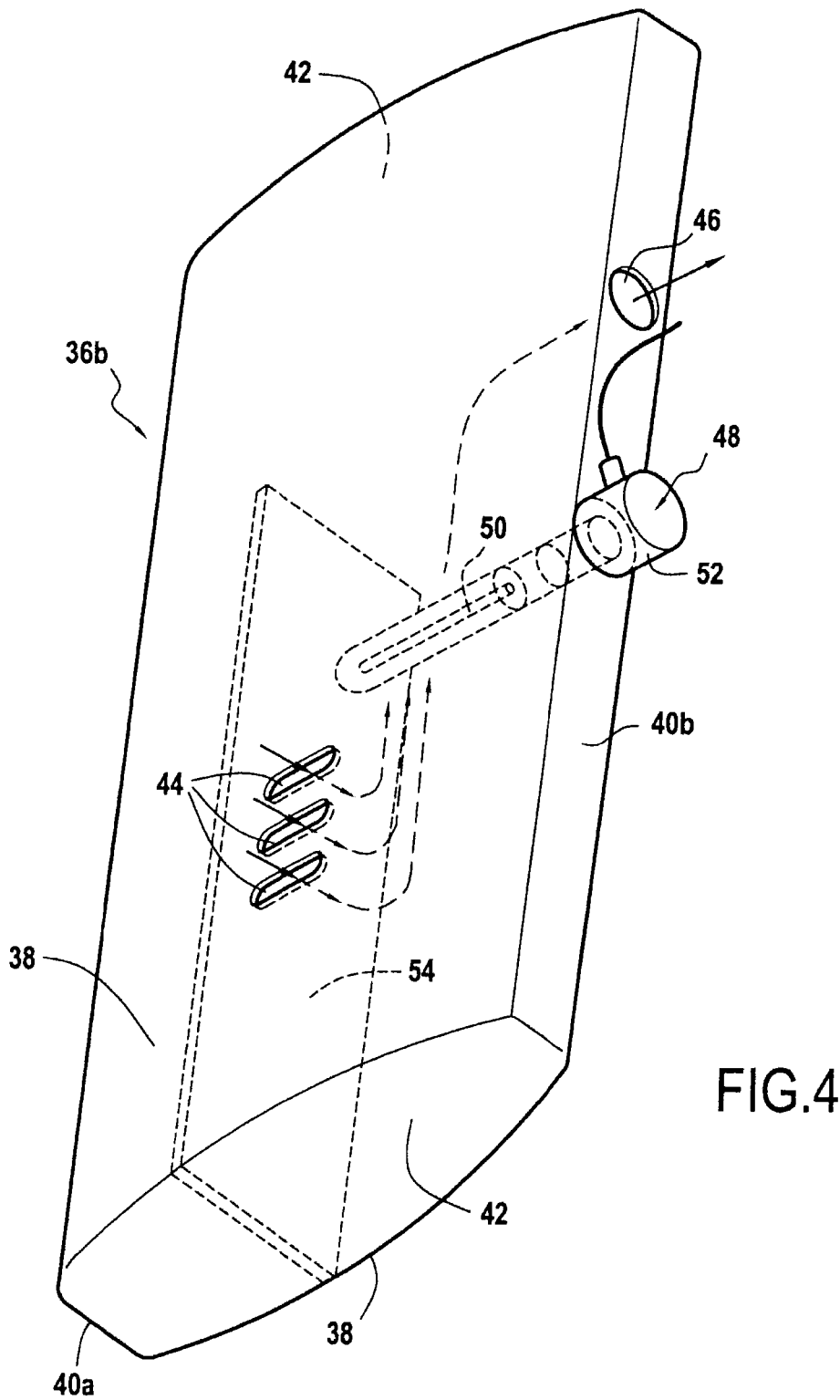
FIG. 4 is a diagrammatic perspective view of the FIG. 3 measurement device.

As shown in FIG. 4, the connection arm 36b is in the form of a hollow rigid structure comprising in particular two side walls 38 arranged in a longitudinal plane (relative to the longitudinal axis X-X). These side walls are connected together in airtight manner, firstly at their longitudinal ends by walls forming a leading edge 40a and a trailing edge 40b, and secondly at their radial ends by transverse walls 42.

The inside volume defined by the side walls 38, the walls forming the leading edge 40a and the trailing edge 40b, and the transverse walls 42 is airtight (with the exception of inlet and outlet orifices for air as described below).

One of the side walls 38 of the connection arm 36b has one or more air inlet orifices 44 (three of them in the figures), which orifices open into the primary stream flow passage 16 in the swan neck, and lead into the inside of the hollow structure.

The trailing edge wall 40b of the connection arm 36b also has one or more air outlet orifices 46 opening to the inside of the hollow structure and leading into a zone of the turbojet where the surrounding pressure is lower than the pressure in the primary stream flow passage 16 entering the high-pressure compressor 22. In the embodiment shown in FIGS. 1 to 3, the outlet orifice 46 is a single orifice and it leads into the secondary stream flow passage 18 (where the pressure is less than the pressure in the primary stream flow passage in the swan neck).

Alternatively, the outlet orifice(s) of the connection arm 36b could lead into the stationary structure 37 of the turbojet situated between the passages 16 and 18. In known manner, the stationary structure 37 communicates at its downstream end directly with the outside of the turbojet (where the pressure is likewise less than the pressure in the primary stream flow passage in the swan neck).

Similarly, it is naturally possible to envisage that the air inlet and outlet orifices are positioned in other walls of the connection arm.

Thus, the pressure difference that exists between the secondary stream flow passage 18 into which the air outlet orifice 46 leads and the primary stream flow passage 16 in the swan neck serves to ensure that a portion of the primary stream flow passes via the air inlet orifices 44, flows inside the connection arm 36b, and leaves via the secondary stream flow passage 18 by passing through the air outlet orifice 46.

The connection arm 36b also includes a temperature probe 48 having its sensitive element 50 arranged inside the hollow structure. Thus, the temperature probe 48 serves to measure the temperature of the primary stream taken from the primary stream flow passage 16 in the swan neck and flowing inside the hollow structure forming the connection arm 36b.

By way of example, the temperature probe 48 may be of the pencil type having a platinum wire wound around a mandrel and covered by a protective sheath, thereby constituting the sensitive element of the probe. Such a temperature probe is well known to the person skilled in the art and is therefore not described in detail herein.

Preferably, the head 52 of the temperature probe 48 is mounted in leaktight manner against the wall forming the trailing edge 40b of the connection arm and is positioned level with the stationary structure 37 of the turbojet that is situated between the passages 16 and 18 (thereby making it easily accessible).

Also preferably, the sensitive element 50 of the temperature probe extends in a direction that is substantially parallel to the longitudinal axis X-X and it is positioned radially between the air inlet orifices 44 and the air outlet orifice 46 so that it lies on the path of the gas flow inside the connection arm 36b.

In known manner, the temperature probe is connected to the electronic computer of the turbojet (not shown in the figures) where the measured data is processed.

It should be observed that the air inlet and outlet orifices of the connection arm 36b are calibrated so as to take a sufficient flow of the primary stream to feed the temperature probe regardless of the speed at which the turbojet is operating. This minimum flow is a function in particular of the characteristics of the temperature probe.

It should also be observed that the leaktight inside volume through which there flows the primary stream sample taken from the passage 16 may be smaller than the total inside volume of the connection arm 36b (e.g. by adding partitions). Thus, in the embodiment of FIG. 4, a partition 54 extends radially from the transverse wall 42 forming an end wall and is provided in order to improve the flow of air around the temperature probe 48 by confining the flow in this restricted space.

It should also be observed that the response time of the temperature probe resulting from its positioning inside a connection arm of the intermediate casing may be compensated by an appropriate processing algorithm.

The invention claimed is:

1. A device for measuring a compressor inlet temperature in a primary stream flow passage of a bypass turbojet, the device comprising:
   a hollow structure forming a connection arm of an intermediate casing of the turbojet and configured to pass radially through a flow passage for the primary stream and a flow passage for a secondary stream of the turbojet, the connection arm including at least one inlet air orifice opening out into the primary stream flow passage at an inlet of a high pressure compressor and at least one air outlet orifice leading to a zone of the turbojet in which surrounding pressure is less than pressure in the primary stream flow passage at the inlet of the high pressure compressor; and
   a temperature probe having its sensitive element arranged inside the connection arm.

2. A device according to claim 1, wherein the connection arm comprises two side walls connected together in an airtight manner, firstly by walls forming a leading edge and a trailing edge, and secondly by transverse walls.

3. A device according to claim 2, wherein the air inlet orifice of the connection arm is formed in a side wall and the air outlet orifice is formed in the wall forming the trailing edge.

4. A device according to claim 2, wherein the temperature probe is mounted in an airtight manner against the wall of the connection arm that forms the trailing edge.

5. A device according to claim 2, further comprising a partition extending radially from one of the transverse walls to improve flow of air around the temperature probe by confining the temperature probe in a restricted space.

6. A device according to claim 1, wherein the temperature probe is of pencil type.

7. A device according to claim 1, wherein the air outlet orifice of the connection arm is configured to lead into the secondary stream flow passage of the turbojet.

8. An intermediate casing for a bypass turbojet, the casing comprising:
   a hub;
   an outer annular shroud arranged around the hub, concentrically thereabout; and
   a device according to claim 1, the connection arm of the device connecting the hub radially to the outer shroud.

9. An intermediate casing according to claim 8, wherein the sensitive element of the temperature probe of the device is arranged inside the connection arm to extend in a direction that is substantially parallel to an axis of revolution of the hub and of the shroud.

10. A bypass turbojet comprising an intermediate casing according to claim 8.

\* \* \* \* \*